(12) United States Patent
Ram et al.

(10) Patent No.: US 9,929,884 B2
(45) Date of Patent: Mar. 27, 2018

(54) SYSTEMS AND METHODS FOR DETECTING DATA IN A RECEIVED MULTIPLE-INPUT-MULTIPLE-OUTPUT (MIMO) SIGNAL

(71) Applicant: Marvell World Trade Ltd., St. Michael (BB)

(72) Inventors: B Hari Ram, Chennai (IN); Lokesh Sundaramurthy Satrasala, Bangalore (IN); Sri Varsha Rottela, Andhra Pradesh (IN)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 15/251,654

(22) Filed: Aug. 30, 2016

(65) Prior Publication Data

US 2017/0118050 A1   Apr. 27, 2017

Related U.S. Application Data

(60) Provisional application No. 62/244,313, filed on Oct. 21, 2015.

(51) Int. Cl.
*H04L 27/06* (2006.01)
*H04L 1/00* (2006.01)
(Continued)

(52) U.S. Cl.
CPC ............ *H04L 27/06* (2013.01); *H04L 1/0054* (2013.01); *H04L 25/03159* (2013.01);
(Continued)

(58) Field of Classification Search
CPC . H04L 1/0054; H04L 25/03318; H04L 27/06; H04L 25/03159; H04L 25/067;
(Continued)

(56) References Cited

U.S. PATENT DOCUMENTS 8,331,475 B1* 12/2012 Palanivelu ........ H04L 25/03961
375/261
8,737,540 B1* 5/2014 Shi ........................ H04L 25/067
375/340

(Continued)

OTHER PUBLICATIONS

International Search Report and Written Opinion dated Feb. 15, 2017 in related/corresponding International PCT Patent Appl. No. PCT/IB2016/001289, filed Aug. 30, 2016.
(Continued)

*Primary Examiner* — Syed Haider

(57) ABSTRACT

Systems and methods for detecting data in a received multiple-input-multiple-output signal are provided. N signals are received from N antennas, with M being greater than or equal to three. The N signals form a vector y and are associated with M sets of data values, where the M sets of data values form a vector x. A channel matrix (H) is estimated, and a QR decomposition of the channel matrix is performed, such that H=QR. The vector y is transformed into a vector z according to $z=Q^H y$. The R matrix and the rotated signal vector z are transformed such that one or more elements of the R matrix having complex number values are set equal to zero. Distance values are calculated using the transformed vector z and the vector x. Log likelihood ratio (LLR) values are calculated based on the distance values.

15 Claims, 8 Drawing Sheets

(51) Int. Cl.
*H04L 25/03* (2006.01)
*H04L 25/06* (2006.01)

(52) U.S. Cl.
CPC .. *H04L 25/03318* (2013.01); *H04L 25/03891* (2013.01); *H04L 25/067* (2013.01); *H04L 2025/03426* (2013.01)

(58) Field of Classification Search
CPC ......... H04L 25/03891; H04L 25/03426; H04L 2025/03426
See application file for complete search history.

(56) References Cited

U.S. PATENT DOCUMENTS

| | | | |
|---|---|---|---|
| 8,903,025 B1* | 12/2014 | Chandrasekar | ... H04L 25/03318 375/340 |
| 8,929,472 B1* | 1/2015 | Lee | ...................... H04B 7/0885 375/267 |
| 2007/0032206 A1 | 2/2007 | Hwang et al. | |
| 2009/0190683 A1* | 7/2009 | Awater | ...................... H04L 1/06 375/262 |
| 2010/0293210 A1 | 11/2010 | Sima et al. | |
| 2011/0090893 A1* | 4/2011 | Higuchi | ............... H04B 7/0413 370/342 |
| 2011/0188615 A1* | 8/2011 | Yang | ...................... H04L 27/06 375/341 |
| 2011/0264721 A1 | 10/2011 | Patel et al. | |
| 2013/0251074 A1* | 9/2013 | Uln | ...................... H04L 1/0054 375/341 |

OTHER PUBLICATIONS

Persson, Lecture 6 Householder Reflectors and Givens Rotations, Sep. 26, 2006, [retrieved on Jan. 17, 2017] Retrieve from the internet <URL: https://ocw.mit.edu/courses/mathematics/18-335j-introduction-to-numerical-methods-fall-2010/lecture-notes/MIT18_335JF10_lec10b_hand.pdf>, pp. 1-13.

* cited by examiner

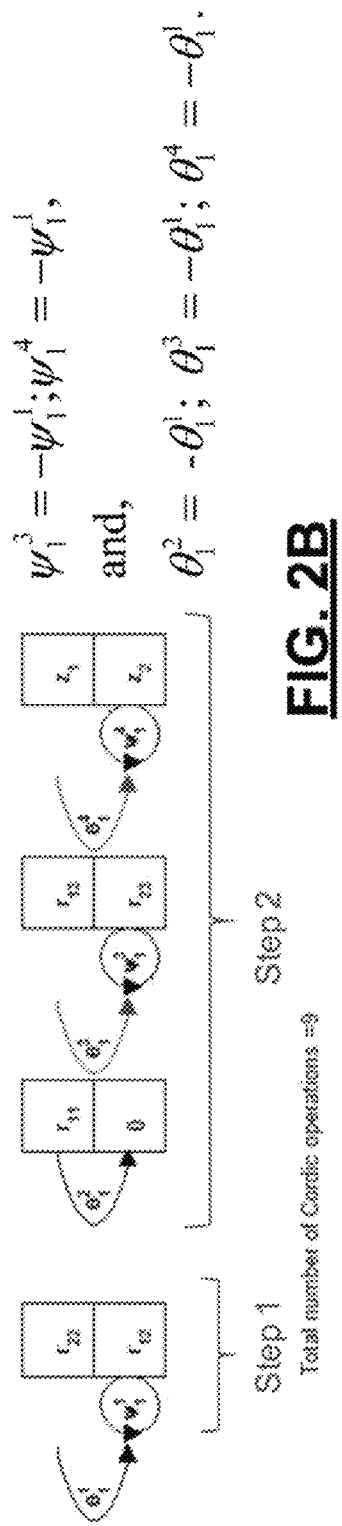
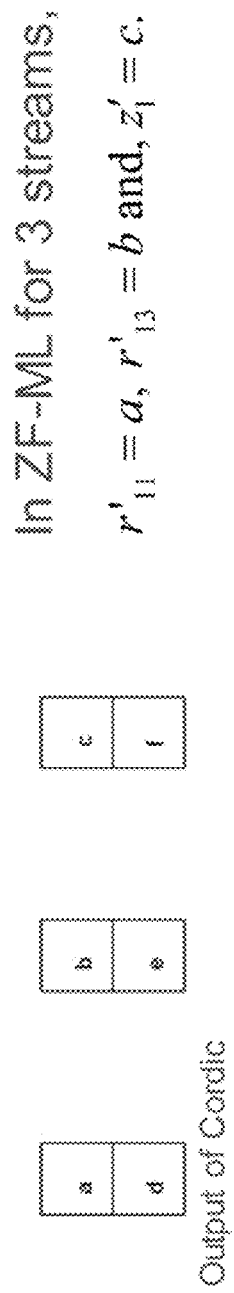
$\psi_1^3 = -\psi_1^1; \psi_1^4 = -\psi_1^1,$
and,
$\theta_1^2 = -\theta_1^1; \theta_1^3 = -\theta_1^1; \theta_1^4 = -\theta_1^1.$
FIG. 2B
In ZF-ML for 3 streams,
$r'_{11} = a, r'_{13} = b$ and, $z'_1 = c.$
FIG. 2C

US 9,929,884 B2

SYSTEMS AND METHODS FOR DETECTING DATA IN A RECEIVED MULTIPLE-INPUT-MULTIPLE-OUTPUT (MIMO) SIGNAL

CROSS-REFERENCE TO RELATED APPLICATIONS

This disclosure claims priority to U.S. Provisional Patent Application No. 62/244,313, filed on Oct. 21, 2015, the entirety of which is incorporated herein by reference.

TECHNICAL FIELD

The technology described in this document relates generally to signal receivers and more particularly to reduced-complexity computation techniques used for detecting data in received multiple-input-multiple-output (MIMO) signals.

BACKGROUND

In the field of wireless communications, MIMO-OFDM (Multiple-Input and Multiple-Output, Orthogonal Frequency-Division Multiplexing) technology has been used to achieve increased data throughput and link range without requiring additional bandwidth or increased transmission power. MIMO-OFDM technology utilizes multiple transmission antennas at a transmitter and multiple receiving antennas at a receiver to enable a multipath rich environment with multiple orthogonal channels existing between the transmitter and the receiver. Data signals are transmitted in parallel over these channels, and as a result, both data throughput and link range are increased. Due to these advantages, MIMO-OFDM has been adopted in various wireless communication standards, such as IEEE 802.11n/11ac, 4G, 3GPP Long Term Evolution (LTE), WiMAX, and HSPA+.

SUMMARY

The present disclosure is directed to systems and methods for detecting data in a received multiple-input-multiple-output (MIMO) signal. In an example method for detecting data in a received MIMO signal, a first signal (y1), a second signal (y2), and a third signal (y3) are received via a transmission channel from first, second, and third antennas, respectively. The received signals are associated with first data values (x1), second data values (x2), and third data values (x3). The first signal, the second signal, and the third signal are formed into a received signal vector y. The first data values, the second data values, and the third data values are formed into a vector x. A channel matrix (H) representing effects of the transmission channel on the first data values, the second data values, and the third data values is estimated. A QR decomposition of the channel matrix is performed, such that H=QR, where Q matrix is a unitary matrix and R matrix is an upper triangular matrix. The received signal vector y is transformed into a rotated signal vector z according to $z=Q^H y$. The R matrix and the rotated signal vector z are transformed such that one or more elements of the R matrix having complex number values are set equal to zero. Distance values are calculated using the transformed vector z and the vector x. One or more log likelihood ratio (LLR) values are calculated based on the distance values.

An example system for detecting data in a received MIMO signal comprises one or more antennas configured to receive, via a transmission channel, a first signal (y1), a second signal (y2), and a third signal (y3). The received signals are associated with first data values (x1), second data values (x2), and third data values (x3). The first signal, the second signal, and the third signal form a received signal vector y. The first data values, the second data values, and the third data values form a vector x. The system further comprises a QR decomposer configured to transform a channel matrix (H) representing effects of the transmission channel on the first data values, the second data values, and the third data values. The channel matrix is transformed via a QR decomposition such that H=QR, where Q matrix is a unitary matrix and R matrix is an upper triangular matrix. A matrix transformer is configured to transform the received signal vector y into a rotated signal vector z according to $z=Q^H y$. The matrix transformer further transforms the R matrix and the rotated signal vector z such that one or more elements of the R matrix having complex number values are set equal to zero. The system further includes a distance value determiner configured to determine distance values using the transformed vector z and the vector x, and one or more log likelihood ratio (LLR) values are calculated based on the distance values. In embodiments, a memory is programmed to store the transformed R matrix, and the distance value determiner utilizes elements of the transformed R matrix in calculating the distance values.

In another example method for detecting data in a received MIMO signal, N signals are received from N antennas, where the received signals are associated with M sets of data values, M being greater than or equal to three. The N signals are formed into a received signal vector y, and the M sets of data values into a vector x. A channel matrix (H) representing effects of the transmission channel on the M sets of data values is estimated. A QR decomposition of the channel matrix is performed, such that H=QR, where Q matrix is a unitary matrix and R matrix is an upper triangular matrix. The received signal vector y is transformed into a rotated signal vector z according to $z=Q^H y$. The R matrix and the rotated signal vector z are transformed such that one or more elements of the R matrix having complex number values are set equal to zero. Distance values are calculated using the transformed vector z and the vector x, and one or more log likelihood ratio (LLR) values are calculated based on the distance values.

Another example system for detecting data in a received MIMO signal comprises one or more antennas configured to receive, via a transmission channel, N signals from N antennas. The received signals are associated with M sets of data values. The N signals form a received signal vector y. The M sets of data values form a vector x. The system further comprises a QR decomposer configured to transform a channel matrix (H) representing effects of the transmission channel on the M sets of data values. The channel matrix is transformed via a QR decomposition such that H=QR, where Q matrix is a unitary matrix and R matrix is an upper triangular matrix. A matrix transformer is configured to transform the received signal vector y into a rotated signal vector z according to $z=Q^H y$. The matrix transformer further transforms the R matrix and the rotated signal vector z such that one or more elements of the R matrix having complex number values are set equal to zero. The system further includes a distance value determiner configured to determine distance values using the transformed vector z and the vector x, and one or more log likelihood ratio (LLR) values are calculated based on the distance values. In embodiments, a memory is programmed to store the transformed R matrix, with the distance value determiner utilizing elements of the transformed R matrix in calculating the distance values.

In another example method for detecting data in a received MIMO signal, a first signal (y1), a second signal (y2), and a third signal (y3) are received, via a transmission channel, from first, second, and third antennas. The received signals are associated with first data values (x1), second data values (x2), and third data values (x3). A channel matrix H representing effects of the transmission channel on the first data values, the second data values, and the third data values is estimated. A QR decomposition of the channel matrix H is performed to obtain an upper triangular matrix. First log likelihood ratio (LLR) values are calculated after the performing of the QR decomposition using a first algorithm. Second LLR values are calculated after the performing of the QR decomposition using a second algorithm. The first and second LLR values are combined.

Another example system for detecting data in a received MIMO signal comprises one or more antennas configured to receive, via a transmission channel, a first signal (y1), a second signal (y2), and a third signal (y3) from first, second, and third antennas. The received signals are associated with first data values (x1), second data values (x2), and third data values (x3). The first signal, the second signal, and the third signal form a received signal vector y. The first data values, the second data values, and the third data values form a vector x. The system further comprises a QR decomposer configured to transform a channel matrix H representing effects of the transmission channel on the first data values, the second data values, and the third data values. The system also includes an LLR calculator configured to calculate (i) first log likelihood ratio (LLR) values based on a first algorithm, and (ii) second LLR values based on a second algorithm. The first and second LLR values are combined. In embodiments, a memory is programmed to store the channel matrix H, with the LLR calculator utilizing elements of the channel matrix H in calculating the LLR values.

In another example method for detecting data in a received MIMO signal, N signals are received from N antennas, where the received signals are associated with M sets of data values. A channel matrix H representing effects of the transmission channel on the M data values is estimated. A QR decomposition of the channel matrix H is performed to obtain an upper triangular matrix. L log likelihood ratio (LLR) values are calculated after the performing of the QR decomposition using L algorithms. The L LLR values are combined.

Another example system for detecting data in a received MIMO signal comprises one or more antennas configured to receive, via a transmission channel, N signals from N antennas. The received signals are associated with M set of data values. The N signals form a received signal vector y. The M sets of data values form a vector x. The system further comprises a QR decomposer configured to transform a channel matrix H representing effects of the transmission channel on the M data values. The system also includes an LLR calculator configured to calculate L log likelihood ratio (LLR) values based on L algorithms. The L LLR values are combined. In embodiments, a memory is programmed to store the channel matrix H, with the LLR calculator utilizing elements of the channel matrix H in calculating the LLR values.

In another example method for detecting data in a received MIMO signal, a first signal (y1) and a second signal (y2) are received via a transmission channel from first and second antenna. The received signals are associated with first data values (x1) and second data values (x2). The first signal and the second signal are formed into a received signal vector y, and the first data values and the second data values are formed into a vector x. A channel matrix (H) representing effects of the transmission channel on the first data values and the second data values is estimated. A QR decomposition of the channel matrix is performed, such that H=QR, where Q matrix is a unitary matrix and R matrix is an upper triangular matrix. The received signal vector y is transformed into a rotated signal vector z according to $z=Q^H y$. Distance values are calculated using the rotated signal vector z and the vector x according to a distance metric, where the distance metric includes at least first and second terms, and a variable in the first term is permitted to have a different value than the same variable in the second term. One or more log likelihood ratio (LLR) values are calculated based on the distance values.

Another example system for detecting data in a received MIMO signal comprises one or more antennas configured to receive, via a transmission channel, a first signal (y1) and a second signal (y2). The received signals are associated with first data values (x1) and second data values (x2). The first signal and the second signal form a received signal vector y, and the first data values and the second data values form a vector x. The system further comprises a QR decomposer configured to transform a channel matrix (H) representing effects of the transmission channel on the first and second data values. The channel matrix is transformed via a QR decomposition such that H=QR, where Q matrix is a unitary matrix and R matrix is an upper triangular matrix. A matrix transformer is configured to transform the received signal vector y into a rotated signal vector z according to $z=Q^H y$. The system further includes a distance value determiner configured to calculate distance values using the rotated signal vector z and the vector x according to a distance metric. The distance metric includes at least first and second terms, where a variable in the first term is permitted to have a different value than the same variable in the second term. One or more log likelihood ratio (LLR) values are calculated based on the distance values. In embodiments, a memory is programmed to store the channel matrix H, and the distance value determiner utilizes elements of the channel matrix H in calculating the distance values.

BRIEF DESCRIPTION OF THE FIGURES

FIG. 2B illustrates example coordinate rotational digital computer (CORDIC) operations utilized in transforming an R matrix and a z vector, according to an embodiment of the present disclosure.

FIG. 2C illustrates example outputs of the CORDIC operations of FIG. 2B according to an embodiment of the present disclosure.

DETAILED DESCRIPTION

Figure 1:
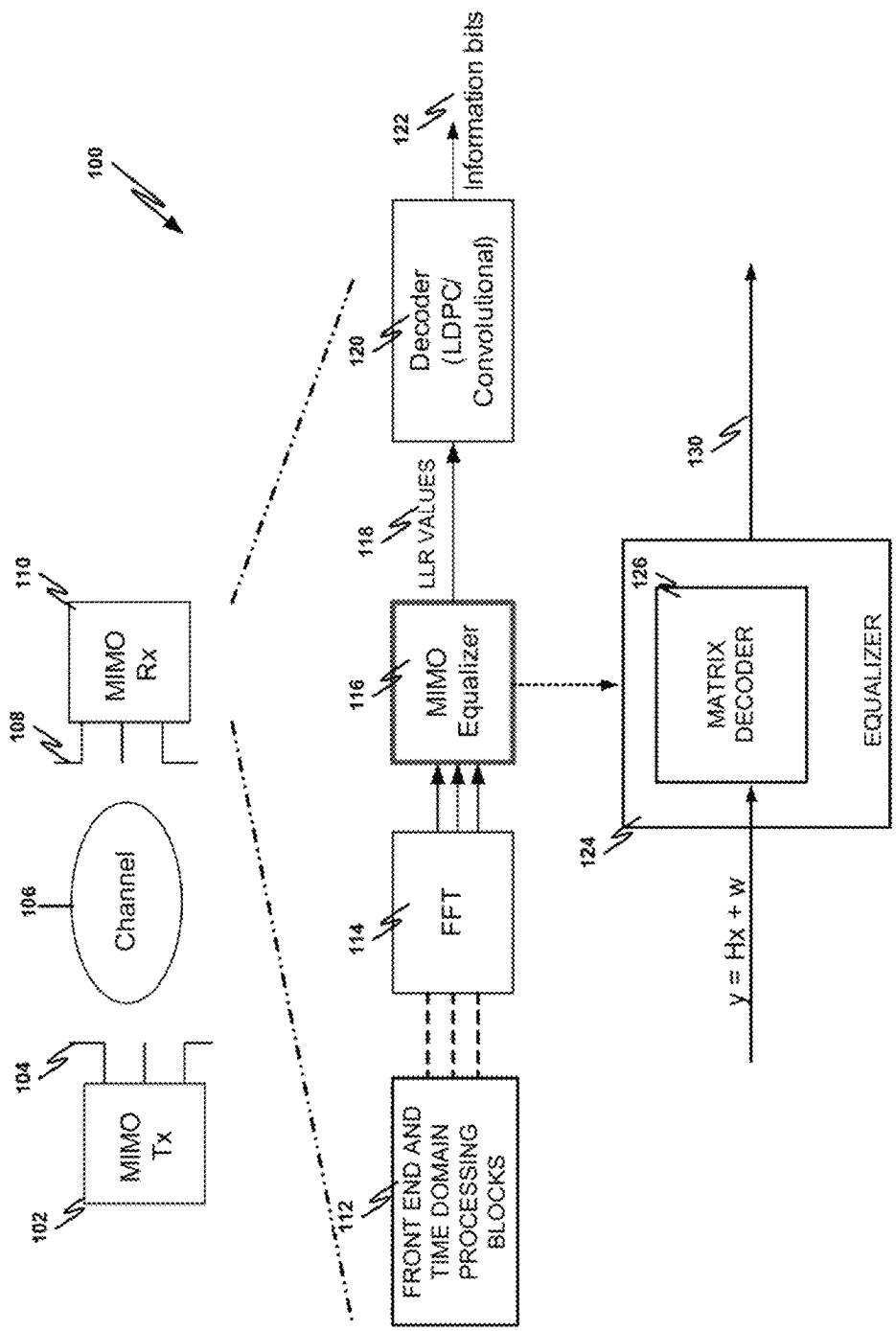
FIG. 1 is a block diagram of an example multiple-input-multiple-output (MIMO) communication system including a MIMO transmitter, MIMO receiver, and channel.

FIG. 1 is a block diagram 100 of an example multiple-input-multiple-output (MIMO) communication system including a MIMO transmitter 102, MIMO receiver 110, and channel 106. The MIMO communication system allows more than one spatial stream to be transmitted, and in the example of FIG. 1, three spatial streams are used. It is noted that the systems and methods described herein are not limited to scenarios where three spatial streams are used. For instance, in embodiments, the systems and methods described herein are used in systems with two spatial streams and/or a number of spatial streams that is greater than or equal to three. In the MIMO transmitter 102, data to be transmitted is provided as a stream of 1's and 0's to an encoder. The encoder encodes the data to be transmitted with, for example, an error correcting code. The output of the encoder is provided to a spatial stream splitter and divided into spatial streams (e.g., three spatial streams in the example of FIG. 1). These spatial streams are then propagated to a frequency modulator and frequency modulated into symbols, which may be represented as a sequence of complex numbers. The frequency modulated signals are then sent through three antennas 104 and transmitted through the transmission channel 106. The transmission channel 106 may include, for example, air. In other examples, fewer than three antennas are used, or more than three antennas are used.

In the example illustrated in FIG. 1, using three antennas 108, the MIMO receiver 110 receives the three signals from the transmission channel 106. In the MIMO receiver 110, the received signals are processed by front end and time domain processing blocks 112 (e.g., analog-to-digital conversion blocks, digital to analog-conversion blocks, etc.). The output of the front end and time domain processing blocks 112 is provided to a fast Fourier Transform (FFT) module 114 and converted from a time domain representation to a frequency domain representation. The converted signals are then propagated to a MIMO equalizer 116. The MIMO equalizer 116 then calculates log-likelihood ratio (LLR) values 118 for each of the received spatial streams. The MIMO equalizer 116 operates in the frequency domain and is configured to remove the channel effects on the received spatial streams. The calculated LLR values 118 are combined by a LLR combiner and provided to a decoder 120. The decoder 120 may be, for example, a low-density parity-check (LDPC) decoder or a convolutional decoder. The decoder 120 decodes the received spatial streams using the LLR values provided by the combiner and generates informational bits output data 122.

The MIMO equalizer 116 utilizes a matrix decoder 126 to perform distance and LLR calculations. As described below, in some embodiments, the matrix decoder 126 implements a "zero-forcing, maximum-likelihood" (ZF-ML) algorithm to perform distance and LLR calculations with a lower complexity as compared to maximum likelihood (ML) techniques. The ZF-ML algorithm utilized by the matrix decoder 126 offers a high degree of accuracy while having a lower complexity as compared to the ML techniques, potentially offering higher throughput and large savings in required hardware, power consumed, and computation time. The ZF-ML algorithm and other algorithms described below (e.g., an LLR combining algorithm, a relaxed distance metric two-stream maximum-likelihood algorithm, etc.) enable a lower power consumption as compared to ML techniques but have a better performance than algorithms such as the conventional zero-forcing algorithm. The algorithms used by the matrix decoder 126 of the present disclosure thus balance complexity and performance.

The matrix decoder 126 receives, via the three antennas 108, a first signal, a second signal, and a third signal transmitted through the channel 106. The matrix decoder 126 utilizes one or more low complexity algorithms (as described below) and computes LLR values based on the received signals. Specifically, the received first, second, and third signals may be represented by the equation y=Hx+n, where y represents the received signals at the MIMO receiver 110, x represents the data values of the symbols in the spatial streams transmitted by the MIMO transmitter 102, H is a channel matrix representing combined effects of the transmission channel 106 and spatial mapping of the MIMO transmitter 102 on the transmitted signal, and n represents noise. In the three spatial stream case, y is a 3×1 vector ($[y_1, y_2, y_3]^T$), x is a 3×1 vector ($[x_1, x_2, x_3]^T$), H is a 3×3 vector $$\begin{bmatrix} h_{11} & h_{12} & h_{13} \\ h_{21} & h_{22} & h_{23} \\ h_{31} & h_{32} & h_{33} \end{bmatrix},$$

and n is a 3×1 vector ($[n_1, n_2, n_3]^T$). Thus, a 3×3 MIMO system with the three spatial streams may be described by the following equation:

$$\underbrace{\begin{bmatrix} y_1 \\ y_2 \\ y_3 \end{bmatrix}}_{y} = \underbrace{\begin{bmatrix} h_{11} & h_{12} & h_{13} \\ h_{21} & h_{22} & h_{23} \\ h_{31} & h_{32} & h_{33} \end{bmatrix}}_{H} \underbrace{\begin{bmatrix} x_1 \\ x_2 \\ x_3 \end{bmatrix}}_{x} + \underbrace{\begin{bmatrix} n_1 \\ n_2 \\ n_3 \end{bmatrix}}_{n}.$$

Assuming an additive white Gaussian noise (AWGN) model and perfect channel estimation, the equalizer 124 seeks optimal estimates of symbols $x_1$, $x_2$, and $x_3$ so as to minimize a Euclidian distance:

$$\|y - Hx\|^2 = \sum_{i=1}^{3} |y_i - h_{i1}x_1 - h_{i2}x_2 - h_{i3}x_3|^2.$$

An exact solution corresponds to the triplet of symbols ($x_1$, $x_2$, $x_3$) that minimizes the Euclidean distance above by performing an exhaustive, brute-force search of the 3-dimensional space. For higher-order constellations, such as 64-QAM or 256-QAM, this involves a search over $64^3$ or $256^3$ symbols in parallel for each tone. This leads to prohibitive complexity, as there could be as many as 256 tones (or OFDM subcarriers) for 802.11ac that need to be processed simultaneously. As noted above, the MIMO equalizer 116 of FIG. 1 includes the matrix decoder 126 that is configured to perform distance and LLR calculations using algorithms and procedures (e.g., the ZF-ML algorithm, LLR combining algorithm, relaxed distance metric two-stream maximum-likelihood algorithm, etc.) that balance complexity and performance. The algorithms and procedures described herein offer a high degree of accuracy while having a lower complexity.

Figure 2A:
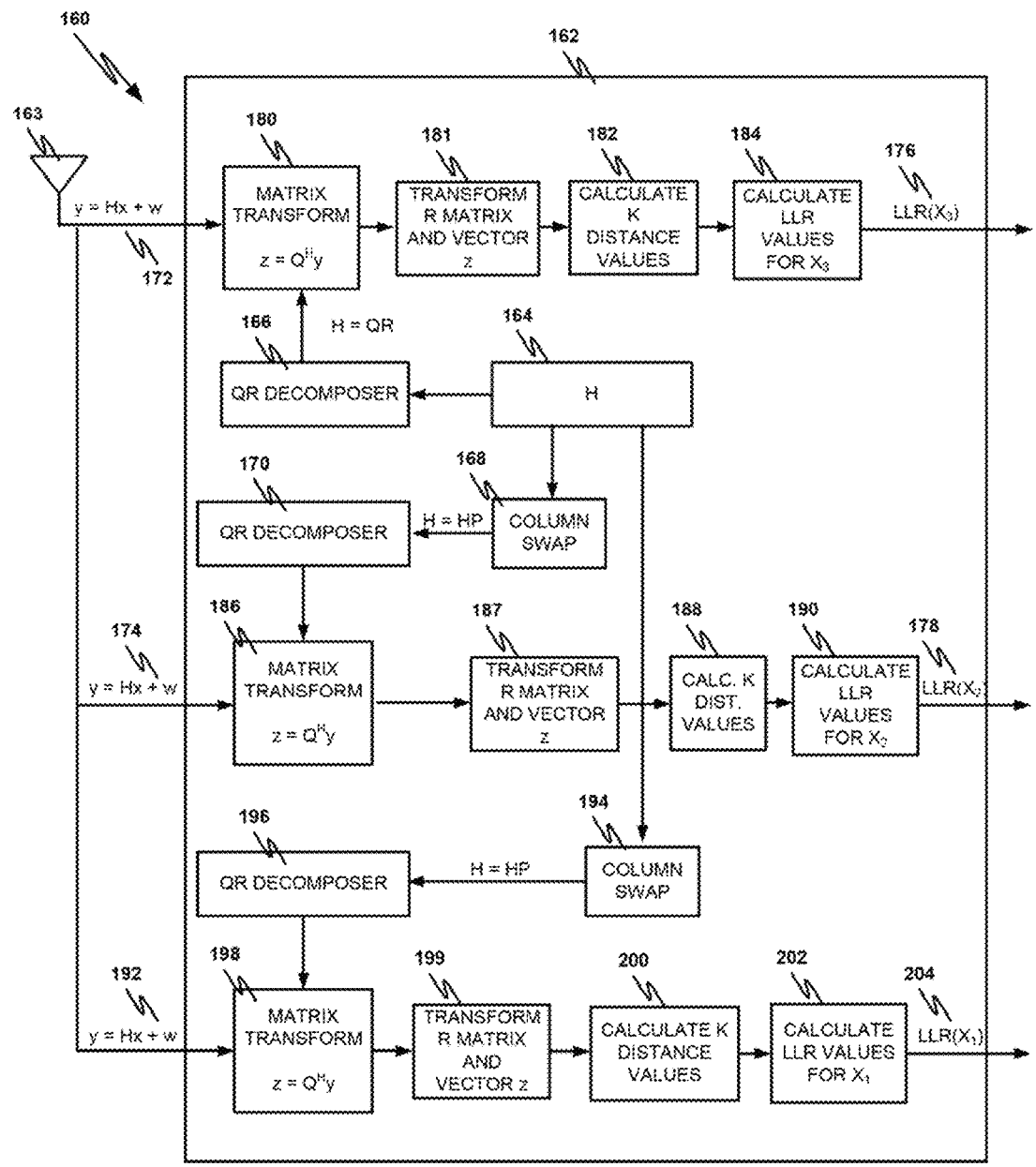
FIG. 2A is a block diagram illustrating internal components of an example matrix decoder for use in a receiver, where the example matrix decoder implements a zero-forcing, maximum-likelihood (ZF-ML) algorithm for determining log-likelihood ratio ("LLR") values for three spatial streams.

FIG. 2A is a block diagram 160 illustrating internal components of an example matrix decoder 162 for use in a receiver, where the example matrix decoder implements a zero-forcing, maximum-likelihood (ZF-ML) algorithm for determining log-likelihood ratio ("LLR") values for three spatial streams. Although the example of FIG. 2A uses the ZF-ML algorithm in the context of a system utilizing three spatial streams, the ZF-ML algorithm is not limited to this context. As described below, in embodiments, the ZF-ML algorithm is used in systems with M spatial streams, where M is greater than or equal to three. Prior to receiving data signals over the one or more antennas 163, matrix calculations are done with respect to the estimated channel matrix H 164. As illustrated at 166, a QR decomposition of the H matrix 164 may be performed such that H=QR. The Q matrix is a unitary matrix, and the R matrix is an upper triangular matrix represented as $$R = \begin{bmatrix} r_{11} & r_{12} & r_{13} \\ 0 & r_{22} & r_{23} \\ 0 & 0 & r_{33} \end{bmatrix}.$$

A similar QR decomposition procedure is performed at 170, 196 using a permutated channel matrix, as described in greater detail below. At 168 and 194, the channel matrix H 164 is multiplied by a permutation matrix. In the current example including three spatial streams, the permutation matrices used at 168 and 194 may be, for example, $$P = \begin{bmatrix} 0 & 0 & 1 \\ 0 & 1 & 0 \\ 1 & 0 & 0 \end{bmatrix} \text{ or } P = \begin{bmatrix} 1 & 0 & 0 \\ 0 & 0 & 1 \\ 0 & 1 & 0 \end{bmatrix},$$

such that the columns of the channel matrix H are swapped when multiplied by the permutation matrix. In a modified version of the block diagram 160 of FIG. 2A, rather than swapping columns of the H matrix 164, columns of the R matrix may be swapped.

The matrix decoder 162 executes over three paths 172, 174, 192 that may operate in series or in parallel. The first path 172 calculates LLR values 176 for data values associated with third stream, the second path 174 calculates LLR values 178 for data values associated with a second stream, and the third path 192 calculates LLR values 204 for data values associated with a first stream. These LLR values 176, 178, 204 may be combined and decoded as described above with reference to FIG. 1.

The first path 172 begins at a matrix transformer 180. In the three spatial stream case, the matrix transformer 180 receives the first, second, and third signals as a 3×1 vector ($[(y_1, y_2, y_3)]^T$). The matrix transformer 180 transforms the y vector according to the relationship $z=Q^H y$, resulting in a 3×1 z vector ($[z_1, z_2, z_3]^T$). Specifically, in the matrix transformer 180, the relationship y=Hx+n may be multiplied by $Q^H$ to obtain $z=Q^H y=Rx+Q^H n$, which is expanded to $$\begin{bmatrix} z_1 \\ z_2 \\ z_3 \end{bmatrix} = \begin{bmatrix} r_{11} & r_{12} & r_{13} \\ 0 & r_{22} & r_{23} \\ 0 & 0 & r_{33} \end{bmatrix} \begin{bmatrix} x_1 \\ x_2 \\ x_3 \end{bmatrix} + \begin{bmatrix} n_1 \\ n_2 \\ n_3 \end{bmatrix}.$$

In the three spatial stream system, each data symbol transmitted, $x_i$ (where i=1 corresponds to data transmitted on a first spatial stream, i=2 corresponds to data transmitted on a second spatial stream, and i=3 corresponds to data transmitted on a third spatial stream) maps to n bits $\{b_1^{(i)}, b_2^{(i)}, \ldots, b_n^{(i)}\}$. $K=2^n$ is the alphabet size of the underlying modulation, such as binary phase shift keying (BPSK), quadrature amplitude modulation (QAM), etc.

In ML approaches, after performing the QR decomposition at 166 and after transforming the received signal vector y into a rotated signal vector z at 180, a minimum distance value is calculated for each of the K possible values of $x_3$. In a system using n=6 bits, the alphabet size K is equal to 64. In the ML approaches, the minimum distance is calculated according to a formula:

$$\|z - Rx\|^2 = |z_1 - r_{11}x_1 - r_{12}x_2 - r_{13}x_3|^2 + \quad \text{(Equation 1)}$$
$$|z_2 - r_{22}x_2 - r_{23}x_3|^2 + |z_3 - r_{33}x_3|^2$$
$$= T_1 + T_2 + T_3,$$

for each possible $x_3$ value. Specifically, $x_1$ and $x_2$ values that minimize the distance $T_1+T_2+T_3$ are determined for each possible $x_3$ value. However, the complexity of computing the $T_1$ term is high, and the computation may require a sliced value $x_2$, thus increasing the complexity of the calculation.

In the ZF-ML algorithm of the present disclosure, a complexity of the distance calculation is reduced by transforming the R matrix and the rotated signal vector z such that one or more elements of the R matrix having complex number values are set equal to zero. Specifically, in the ZF-ML algorithm of the present disclosure, to decrease the computational complexity and to avoid having to wait for the sliced value of $x_2$, the R matrix and the rotated signal vector z are transformed such that an $r_{12}$ element of the R matrix is set equal to zero (i.e., $r_{12}=0$). Prior to the transformation, the $r_{12}$ element is a complex number value, which results in increased complexity in calculating the $T_1$ term in Equation 1. Thus, by transforming the R matrix and the rotated signal vector z in a manner that eliminates the complex number value $r_{12}$ term from the distance calculation, as described below, a complexity of the distance calculation is reduced.

The transforming of the R matrix and the vector z are shown in a block 181 of FIG. 2A. In embodiments, to achieve $r_{12}=0$, multiplication operations are performed. Specifically, as noted above, prior to the transforming of the R matrix and the rotated signal vector z, the R matrix is $$\begin{bmatrix} r_{11} & r_{12} & r_{13} \\ 0 & r_{22} & r_{23} \\ 0 & 0 & r_{33} \end{bmatrix},$$

and the rotated signal vector z is $[z_1, z_2, z_3]$. In embodiments, after the transforming of the R matrix and the rotated signal vector z, the transformed R matrix is $$\begin{bmatrix} r'_{11} & 0 & r'_{13} \\ 0 & r_{22} & r_{23} \\ 0 & 0 & r_{33} \end{bmatrix},$$

and the transformed vector z is $[z_1', z_2, z_3]$. As can be seen in the transformed R matrix, $r_{12}$ is set equal to zero as a result of the transforming. To achieve this, multiplication operations are performed as follows, to calculate $z_1'$, $r_{11}'$, and $r_{13}'$, respectively:

$$z'_1 = \left(z1 - \frac{r_{12}}{r_{22}}z2\right)\frac{1}{\sqrt{1+\left|\frac{r_{12}}{r_{22}}\right|^2}},$$

$$r'_{11} = r_{11}\frac{1}{\sqrt{1+\left|\frac{r_{12}}{r_{22}}\right|^2}}, \text{ and}$$

$$r'_{13} = \left(r_{13} - \frac{r_{12}}{r_{22}}r_{23}\right)\frac{1}{\sqrt{1+\left|\frac{r_{12}}{r_{22}}\right|^2}}.$$

In embodiments, the above multiplication operations are performed using one or more coordinate rotational digital computer (CORDIC) computations. To illustrate the use of such CORDIC computations, reference is made to FIGS. 2B and 2C. From the above discussion, it can be seen that the operation to make $r_{12}=0$ is $$\text{Row}_1 \leftarrow \frac{1}{\sqrt{1+\frac{|r_{12}|^2}{r_{22}^2}}}\left(\text{Row}_1 - \frac{r_{12}}{r_{22}}\text{Row}_2\right) = \text{Row}_1 \leftarrow \quad \text{(Equation 2)}$$

$$\left(\frac{r_{22}}{\sqrt{r_{22}^2+|r_{12}|^2}}\text{Row}_1 - \frac{|r_{12}|}{\sqrt{r_{22}^2+|r_{12}|^2}}e^{j\angle\theta_{12}}\text{Row}_2\right).$$

If $$\frac{r_{22}}{\sqrt{r_{22}^2+|r_{12}|^2}}$$

can be treated as $\cos(\theta)$, then $$\sin(\theta) = \sqrt{1-\cos^2(\theta)} = \frac{|r_{12}|}{\sqrt{r_{22}^2+|r_{12}|^2}}.$$

Now, Equation 2 is $\text{Row}_1 \leftarrow (\cos(\theta)\text{Row}_1 - \sin(\theta)e^{j\psi}\text{Row}_2)$, where $\psi = \angle r_{12}$. Accordingly, in embodiments, two angles are extracted and applied as per Equation 2 on the other elements.

In embodiments, the extraction of the two angles and the application of the two angles on other elements is performed using CORDIC computations, as shown in FIGS. 2B and 2C. Specifically, in FIG. 2B, in a first step, the angles $\psi_1{}^1=-\psi$, and $\theta_1{}^1=-\theta$ are extracted from $r_{12}$ and $r_{22}$ using CORDIC computation. Subsequently, in a second step, the extracted angles are applied on the other elements of row 1 and row 2 using CORDIC computation, as shown in FIG. 2B. In performing the first and second steps, a total number of 9 CORDIC operations are performed, in embodiments. An output of the CORDIC operations is shown in FIG. 2C.

With reference again to FIG. 2A, using the transformed R matrix $$\begin{bmatrix} r'_{11} & 0 & r'_{13} \\ 0 & r_{22} & r_{23} \\ 0 & 0 & r_{33} \end{bmatrix}$$

and the transformed vector z $[z_1', z_2, z_3]$, a minimum distance value is calculated at 182 for each of the K possible values of $x_3$. The minimum distance calculated at 182 is computed according to the following formula, where R' represents the transformed R matrix and z' represents the transformed vector z:

$$\|z'-R'x\|=T_1'+T_2+T_3=|z_1'-e^{j1}x_1-r_{13}'x_3|^2+|z_2-r_{22}x_2-r_{23}x_3|^2+|z_3-r_{33}x_3|^2, \quad \text{(Equation 3)}$$

for each possible $x_3$ value. As seen above, the complexity of calculating the $T_1'$ term is decreased due to the elimination of the complex number value $r_{12}$ (i.e., the $T_1'$ term is not dependent on $x_2$).

Figure 3:
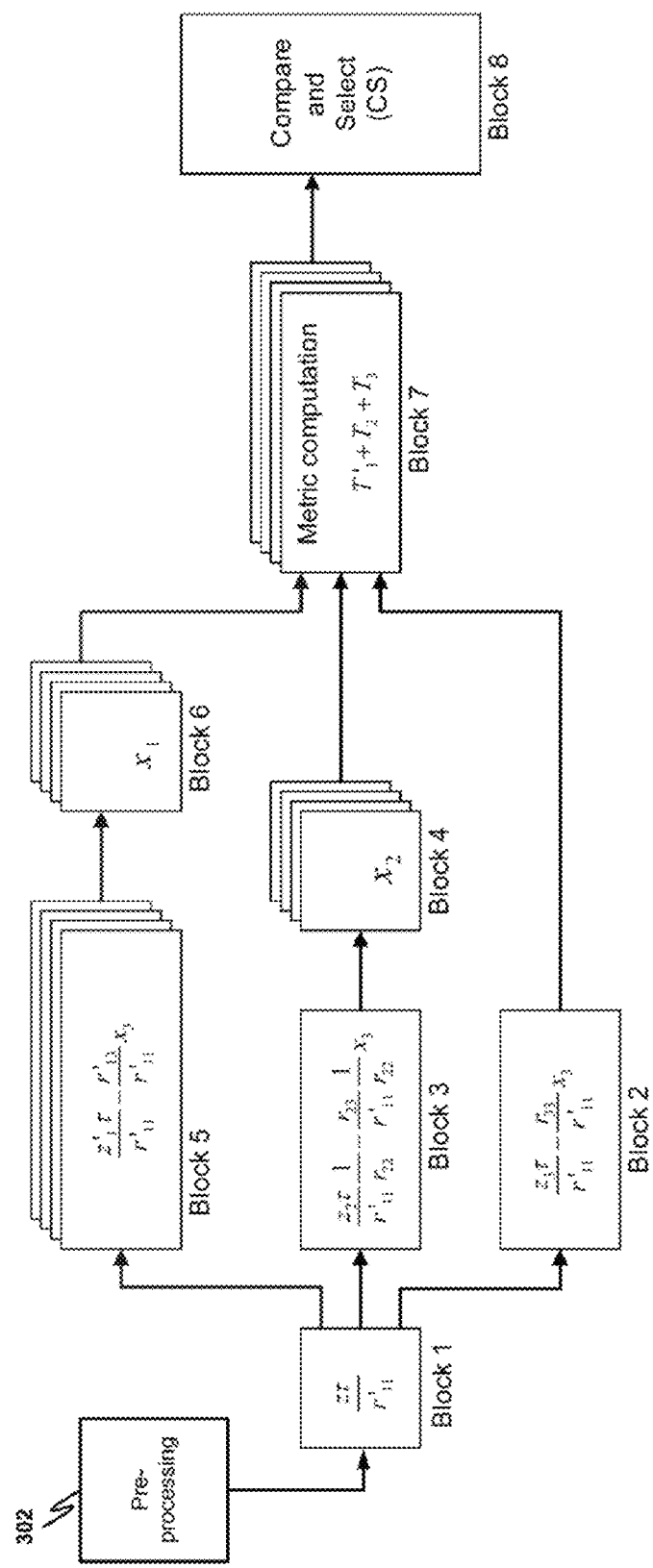
FIG. 3 is a block diagram illustrating an example implementation of a zero-forcing, maximum-likelihood (ZF-ML) algorithm for computing LLR values for the bits in a transmitted signal $x_3$.

It is noted that in the distance metric calculated according to Equation 3 above, the $T_1'$ and $T_2$ terms have the same complexity, and in embodiments where the terms of the distance metric are divided by $r_{11}'$ (e.g., as illustrated in FIG. 3 and discussed below with reference to that figure), the complexity of the $T_1'$ term is reduced further. Using the distance metric calculated according to Equation 3 assumes that noise is independent across $z_1'$, $z_2$, and $z_3$, which is not necessarily true (e.g., $z_1'$ and $z_2$ are correlated in embodiments). Accordingly, the use of this distance metric results in some loss in accuracy. It is thus noted that the use of the ZF-ML algorithm, as described above with reference to FIGS. 2A-2C, provides a balance between performance (e.g., accuracy) and complexity. More specifically, the use of the ZF-ML algorithm offers a high degree of accuracy while having a lower complexity as compared to the ML techniques, potentially offering higher throughput and large savings in required hardware, power consumed, and computation time. The ZF-ML algorithm provides these technical advantages because the performed operation is equivalent to using a zero-forcing (ZF) estimate of $x_2$ from $T_2$ directly (i.e., without slicing) in $T_1$. Since ZF is a linear operation, the operation is simplified in the systems and methods described herein.

When distance values for all possible values of $x_3$ are calculated, LLR values are calculated at 184 for the data associated with the third spatial stream, $x_3$. The calculated LLR values are output as shown at 176. The LLR value for a bit $b_k^{(i)}$ given a received vector y and a known channel matrix H may be represented as:

$$L(b_k^{(i)}) =$$

$$\log \frac{P(b_k^{(i)} = 1)}{P(b_k^{(i)} = 0)} = \log \left\{ \left( \sum_{x \in x_{k,i}} e^{-|y-Hx|^2/2\sigma^2} \right) \bigg/ \left( \sum_{x \in \bar{x}_{k,i}} e^{-|y-Hx|^2/2\sigma^2} \right) \right\},$$

where $x_{k,i}$ is the set of all possible x vectors with $b_k^{(i)}=1$, and $\bar{x}_{k,j}$ is the set of all possible x vectors with $b_k^{(i)}=0$. The following simplification, called the Max-Log Approximation, may also be utilized to calculate the LLR value for a bit $b_k^{(i)}$:

$$L(b_k^{(i)}) \approx \min_{x \in x_{k,j}} \|y - Hx\|^2 - \min_{x \in \bar{x}_{k,j}} \|y - Hx\|^2.$$

A similar process is followed along the second and first paths 174, 192 to calculate LLR values for data associated with the second spatial stream ($x_2$) and the first spatial stream ($x_1$), respectively. At 168, the channel matrix H 164 is permutated to swap the second and third columns of the channel matrix H 164 prior to QR decomposition. Swapping the columns of H in this manner causes the value $x_2$ to be pushed down to the bottom of the x vector ($[x_1\ x_2\ x_3]^T$). Similarly, at 194, the channel matrix H 164 is permutated to swap the first and third columns of the channel matrix H 164 prior to QR decomposition. Swapping the columns of H in this manner causes the value $x_1$ to be pushed down to the bottom of the x vector ($[x_1\ x_2\ x_3]^T$). Following permutation of the channel matrix H 164 at 168 and 194, QR decompositions are performed at 170 and 196 on the permutated channel matrices. Note that similar permutations can also be performed on the columns of R matrix from the QR at 170 or 196 and then perform QR of this permuted R matrix to obtain the LLR values of data associated with second and first spatial streams The second path 174 begins at a second matrix transformer 186. In the three spatial stream case, the matrix transformer 186 receives the first, second, and third spatial stream signals as a 3×1 vector ($[y_1, y_2, y_3]^T$). The second matrix transformer 186 transforms the received y vector according to the relationship $z=Q^H y$, resulting in a 3×1 z vector ($[z_1, z_2, z_3]^T$). Following the z transformation, at 187, the R matrix and z vector are transformed in a similar manner as was described above with reference to step 181. Following these transformations, a minimum distance value is calculated at 188 for each of the K possible values of $x_2$ in a similar manner as was described with respect to $x_3$ at 182. The minimum distance value calculated at 188 is calculated according to the formula:

$$\|z'-R'x\|=T_1'+T_2+T_3=|z_1'-r_{11}'x_1-r_{13}'x_2|^2+|z_2-r_{22}x_3-r_{23}x_2|^2+|z_3-r_{33}x_2|^2.$$

When distance values for all possible values of $x_2$ are calculated, LLR values are calculated at 190 for the data associated with the second spatial stream, $x_2$. The calculated LLR values are output as shown at 178.

The third path 192 begins at a third matrix transformer 198. In the three spatial stream case, the matrix transformer 198 receives the first, second, and third spatial stream signals as a 3×1 vector ($[y_1, y_2, y_3]^T$). The third matrix transformer 198 transforms the received y vector according to the relationship $z=Q^H y$, resulting in a 3×1 z vector ($[z_1, z_2, z_3]^T$). Following the z transformation, at 199, the R matrix and z vector are transformed in a similar manner as was described above with reference to steps 181 and 187. Following these transformations, a minimum distance value is calculated at 200 for each of the K possible values of $x_1$ in a similar manner as was described with respect to $x_3$ and $x_2$. The minimum distance value calculated at 200 is calculated according to the formula:

$$\|z'-R'x\|=T_1'+T_2+T_3=|z_1'-r_{11}'x_2-r_{13}'x_1|^2+|z_2-r_{22}x_3-r_{23}x_1|^2+|z_3-r_{33}x_1|^2.$$

When distance values for all possible values of $x_1$ are calculated, LLR values are calculated at 202 for the data associated with the first spatial stream, $x_1$. The calculated LLR values are output as shown at 204. The calculated LLR values 176, 178, 204 for the $x_3$, $x_2$, and $x_1$ spatial streams are passed to a decoder as soft information, in some embodiments.

Although the ZF-ML algorithm is described above in terms of an example using three spatial streams, this algorithm is applicable to systems having a number of spatial streams that is greater than or equal to three. To illustrate this, consider an example utilizing M spatial streams, where M is greater than or equal to three. In this example, a received signal model is as follows:

$$y = [h_1\ h_2\ \ldots\ h_M]_{N \times M} \begin{bmatrix} x_1 \\ x_2 \\ \vdots \\ x_M \end{bmatrix} + n.$$

To obtain LLR for $x_M$, a QR decomposition is applied on $[h_1 h_2 \ldots h_M]$, resulting in $$z = \begin{bmatrix} r_{11} & r_{12} & \cdots & r_{1M} \\ 0 & r_{22} & \cdots & r_{2M} \\ \vdots & \vdots & \ddots & \vdots \\ 0 & 0 & \cdots & r_{MM} \end{bmatrix} \begin{bmatrix} x_1 \\ x_2 \\ \vdots \\ x_M \end{bmatrix} + n.$$

According to the ZF-ML algorithm of the present disclosure, to reduce the complexity of the computation, any of the non-diagonal element $r_{ij,j>i}$ are set equal to zero. The $r_{ij,j>i}$ can be set equal to zero using an operation $$\text{Row}_i \leftarrow \frac{1}{\sqrt{1 + \frac{|r_{ij}|^2}{r_{jj}^2}}} \left( \text{Row}_i - \frac{r_{ij}}{r_{jj}} \text{Row}_j \right),$$

which can be implemented using CORDIC computations similar to those described above with reference to FIGS. 2B and 2C. It is noted that only $r_{ij,j>i}$ can be set equal to zero without affecting the upper triangle structure. Thus, $r_{ij}$ cannot be set equal to zero by maintaining the upper triangle structure.

FIG. 3 is a block diagram illustrating an example implementation of the ZF-ML algorithm for computing LLR values for the bits in the transmitted signal $x_3$. In FIG. 3, block 1 includes the received signal y, represented as $$\frac{z\tau}{r_{11}'},$$

where the value z results from the relationship $z=Q^H y$ and $r'_{11}$ is a value from the transformed matrix $$R = \begin{bmatrix} r'_{11} & 0 & r'_{13} \\ 0 & r_{22} & r_{23} \\ 0 & 0 & r_{33} \end{bmatrix},$$

and where a QR decomposition of a channel matrix H is performed according to the relationship H=QR. The $\tau$ value is a constellation-specific scaling factor. The received signal y of block 1 is received at a block 2 that is used to determine a $T_3$ value equal to $$\frac{z_3 \tau}{r'_{11}} - \frac{r_{33}}{r'_{11}} x_3.$$

In embodiments, in determining the $T_3$ value in block 2, the $x_3$ value is fixed. For example, the $x_3$ value is initially fixed to a first possible value of $x_3$, and using the fixed first possible value of $x_3$, $x_2$ and $x_1$ values that minimize the $T_2$ and $T_1'$ terms, respectively, are determined.

Continuing in FIG. 3, for the fixed $x_3$ value, a term $$\frac{z_2 \tau}{r'_{11}} \frac{1}{r_{22}} - \frac{r_{22}}{r'_{11}} \frac{1}{r_{22}} x_3$$

of block 3 is used to determine the $x_2$ value that minimizes the $T_2$ term. The $x_2$ value is stored in block 4. For the fixed $x_3$ value, a term $$\frac{z'_1 \tau}{r'_{11}} - \frac{r'_{13}}{r'_{11}} x_3$$

of block 5 is used to determine the $x_1$ value that minimizes the $T_1'$ term. The $x_1$ value is stored in block 6. As can be seen in the figure, the term $$\frac{z'_1 \tau}{r'_{11}} - \frac{r'_{13}}{r'_{11}} x_3$$

of block 5 does not include the $r_{12}$ term. As described above, using the ZF-ML algorithm described herein, the $r_{12}$ term is eliminated from the distance calculation, thus resulting in reduced complexity. To achieve the $r_{12}=0$, a pre-processing block 302 is utilized in some embodiments. The R matrix and the z vector may be considered inputs to the system of FIG. 3, and the pre-processing block 302 is used to modify these inputs as described above to achieve $r_{12}=0$. Thus, for instance, the CORDIC computations and other operations described above are implemented in the pre-processing block 302, in embodiments.

It is noted that according to the ZF-ML algorithm described herein, the output of block 4 (i.e., the $x_2$ value) is not required for block 5. Thus the ZF-ML algorithm relaxes a time constraint because blocks 3 and 4, and blocks 5 and 6 can be computed in parallel along with block 2. Thus, block 7 receives $x_1$, $x_2$, and $x_3$ at a same time (or approximately the same time), in some embodiments.

In block 7, a distance value equal to $T_1'+T_2+T_3$ is calculated based on the $x_3$, $x_2$, and $x_1$ values. The $T_1'+T_2+T_3$ distance value may be calculated according to Equation 3, above, for example. In embodiments, the steps described above are repeated in blocks 1-7 for all possible values of $x_3$ to generate K distance values. The K distance values may be received at a block 8, where the K distance values are further compared and selected to obtain LLRs for the bits corresponding to $x_3$.

Although computation of LLRs corresponding to bits in $x_3$ is illustrated in FIG. 3 and described above, similar block diagram configurations may be used to compute LLRs corresponding to bits in $x_2$ and $x_1$. In a hardware implementation, three identical modules may be used to compute LLRs corresponding to bits in $x_3$, $x_2$, and $x_1$ (e.g., one processing module for each spatial stream). The three identical modules may be configured to operate in parallel, or the modules may be configured to operate in a different configuration (e.g., in series). Each of the modules may include blocks similar to blocks 1-8 of FIG. 3. In other examples, certain of blocks 1-8 may be re-used among the three modules. For example, in example implementations, block 1 may be re-used among all three modules.

The ZF-ML algorithm described above with reference to FIGS. 2A-3 is used, in embodiments, to perform distance and LLR calculations in a manner that balances complexity and performance, as described above. An LLR combining algorithm described below provides additional other embodiments for performing such calculations in a manner that balances complexity and performance. Specifically, in the LLR combining algorithm, multiple detection schemes are used in calculating LLR values, and the LLR values obtained via the different detection schemes are combined. The detection schemes that may be used include (i) the ZF-ML detection scheme described herein, and (ii) the 2ML and 3ML detection schemes (and variants thereof) described in U.S. Pat. No. 8,903,025, the entirety of which is incorporated herein by reference.

As an example of the LLR combining technique, two LLR values obtained via the 2ML detection scheme may be combined with different orderings for three stream detection, for instance. Other combinations of detection schemes can be used under the LLR combining technique (e.g., combinations of 3ML/2ML and/or other detection schemes like ZF-ML, etc.). The combining of LLR values obtained via different detection schemes may enable better performance as compared to using only one detection scheme (e.g., as compared to only using the ZF-ML detection scheme, as compared to only using the 2ML detection scheme, etc.). Further, when multiple detection schemes having a relatively low complexity (e.g., the ZF-ML detection scheme described herein, the 2ML detection scheme described in U.S. Pat. No. 8,903,025, etc.) are combined, the complexity may be less than that of a relatively high complexity detection scheme, while still offering better performance as compared to using only a single low-complexity detection scheme.

In embodiments, the LLR combining technique uses weighted combining. For instance, in embodiments, depending on a detection scheme used, a weight can be assigned to each of the LLR values when combining. The weights can be determined in various ways. For instance, in some embodiments, the weight is fixed across different signal-to-noise (SNR) or signal-to-interference-plus-noise ratio (SINR) values or dynamically determined based on bit error rate (BER) or mutual information (MI) bounds for the detection used at that particular SNR/SINR value. Further, in some embodiments, the LLR combining technique can be a linear combining with equal weights for all detection schemes.

In an embodiment of the LLR combining technique, the technique utilizes 2ML in a three stream detection scenario. In this embodiment, a received signal model is $$y = [h_1 \ h_2 \ h_3]_{3\times3} \begin{bmatrix} x_1 \\ x_2 \\ x_3 \end{bmatrix} + n.$$

To obtain LLR for $x_3$, a QR decomposition technique is applied on $[h_1 \ h_2 \ h_3]$, resulting in $$y_1 = \begin{bmatrix} r_{11} & r_{12} & r_{13} \\ 0 & r_{22} & r_{23} \\ 0 & 0 & r_{33} \end{bmatrix} \begin{bmatrix} x1 \\ x2 \\ x3 \end{bmatrix} + n1.$$

According to this embodiment of the LLR combining technique, the 2ML algorithm described in U.S. Pat. No. 8,903,025 is used for $$y_1' = \begin{bmatrix} r_{22} & r_{23} \\ 0 & r_{33} \end{bmatrix} \begin{bmatrix} x2 \\ x3 \end{bmatrix} + n1'.$$

A first set of LLR values for $x_3$ are calculated based on this expression for $y_1'$.

The QR decomposition technique is further applied on $[h_2 \ h_1 \ h_3]$ (i.e., interchanged first and second columns), resulting in $$y_2 = \begin{bmatrix} l_{11} & l_{12} & l_{13} \\ 0 & l_{22} & l_{23} \\ 0 & 0 & l_{33} \end{bmatrix} \begin{bmatrix} x2 \\ x1 \\ x3 \end{bmatrix} + n2.$$

According to this embodiment of the LLR combining technique, the 2ML algorithm is used for $$y_2' = \begin{bmatrix} l_{22} & l_{23} \\ 0 & l_{33} \end{bmatrix} \begin{bmatrix} x1 \\ x3 \end{bmatrix} + n2'.$$

A second set of LLR values for $x_3$ are calculated based on this expression for $y_2'$. The first and second sets of LLR values are combined (e.g., summed) to obtain final LLR values for $x_3$. Weights may or may not be used in the combining of the first and second sets of LLR values. LLR values for $x_1$ are obtained in a similar manner with the channel matrix for the first set being $[h_2 \ h_3 \ h_1]$ and the channel matrix for the second set being $[h_3 \ h_2 \ h_1]$. LLR values for $x_2$ are obtained in a similar manner with the channel matrix for the first set being $[h_1 \ h_3 \ h_2]$ and the channel matrix for the second set being $[h_3 \ h_1 \ h_2]$.

A relaxed-metric two-stream maximum-likelihood (ML) algorithm described below provides additional other embodiments for performing distance and LLR calculations in a manner that balances complexity and performance. Specifically, the relaxed-metric two-stream ML algorithm is applicable in systems with two spatial streams, where a received signal model is $$y = [h_1 h_2]_{Ns2} \begin{bmatrix} x_1 \\ x_2 \end{bmatrix} + n.$$

In the relaxed-metric two-stream ML algorithm, a QR decomposition is applied on $[h_1 \ h_2]$, resulting in $$\begin{bmatrix} z_1 \\ z_2 \end{bmatrix} = \begin{bmatrix} r_{1,1} & r_{1,2} \\ 0 & r_{2,2} \end{bmatrix} \begin{bmatrix} x_1^{Tx} \\ x_2^{Tx} \end{bmatrix} + \begin{bmatrix} n_1 \\ n_2 \end{bmatrix}.$$

A distance metric used in this embodiment is as follows:

$$D = \|z - Rx\|^2 = |z_1 - r_{11}x_1 - r_{12}x_2|^2 + |z_2 - r_{22}x_2|^2 = T_1 + T_2.$$

In the R matrix above, $r_{11}$ and $r_{22}$ are real number values, and $r_{12}$ is a complex number value. The $T_1$ term of the above distance metric includes the $r_{12}$ complex number value and thus has a relatively high complexity.

Using the relaxed-metric two-stream ML algorithm, a complexity of the $T_1$ term is reduced by changing the $r_{12}$ term from the complex number value to a real number value. In embodiments, this is achieved by transforming the R matrix and the z vector with a unitary matrix. For instance, a unitary matrix $$A = \begin{bmatrix} e^{-j\theta_{22}} & 0 \\ 0 & 1 \end{bmatrix}$$

is used in embodiments to transform the vector z and the R matrix according to $$z' = \underbrace{\begin{bmatrix} e^{-j\theta_{12}} & 0 \\ 0 & 1 \end{bmatrix}}_{A} z,$$

$$D = \left\| z' - \underbrace{AR}_{R'} x \right\|^2 = \|A(z - Rx)\|^2 = \|z - Rx\|^2.$$

Since A is a unitary matrix, the distance metric remains the same. The transforming of the vector z and the R matrix in this manner results in $r_{12}$ and $r_{22}$ being real number values and $r_{11}$ being a complex number value. Accordingly, it can be seen that with this transforming, (i) an element of the R matrix having a complex number value prior to the transforming (e.g., $r_{12}$) has a real number value after the transforming, and (ii) an element of the R matrix having a real number value prior to the transforming (e.g., $r_{11}$) has a complex number value after the transforming.

Continuing the relaxed-metric two-stream ML algorithm, in the following, the notations z' and R' are replaced by z and R, respectively:

$$D = \|z - Rx\|^2 = |z_1 - r_{11}x_1 - r_{12}x_2|^2 + |z_2 - r_{22}x_2|^2$$
$$= (|z_{2R} - r_{2,2}x_{2R}|^2 + |z_{2I} - r_{2,2}x_{2I}|^2) +$$
$$(|z_{1R} - \mathrm{re}\{r_{1,1}x_1\} - r_{1,2}x_{2R}|^2 + |z_{1I} - \mathrm{im}\{r_{1,1}x_1\} - r_{1,2}x_{2I}|^2)$$
$$= \underbrace{(|z_{2R} - r_{2,2}x_{2R}|^2 + |z_{1R} - \mathrm{re}\{r_{1,1}x_1\} - r_{1,2}x_{2R}|^2)}_{\text{only } x_{2R} \text{ term}} +$$

-continued $$\underbrace{(|z_{2I} - r_{2,2}x_{2I}|^2 + |z_{1I} - \text{im}\{r_{1,1}x_1\}) - r_{1,2}x_{2I}|^2)}_{\text{only } x_{2I} \text{ term}},$$

where terms $z_{1R}$, $z_{2R}$, $x_{2R}$ represent real number values and terms $z_{1I}$, $z_{2I}$, $x_{2I}$ represent imaginary number values. In the above, even though the first term has only the $x_{2R}$, and the second term has only the $x_{2I}$, the terms cannot be separated because of the common $r_{1,1}x_1$. In the relaxed-metric two-stream ML algorithm, the $x_1$ variable is relaxed, such that $x_1$ in the first term and the second term are permitted to be different:

$$D=\|z-Rx\|^2=(|z_{2R}-r_{2,2}x_{2R}|^2+|z_{1R}-\text{re}\{r_{1,1}x'_1\}-r_{1,2}x_{2R}|^2)+(|z_{2I}-r_{2,2}x_{2I}|^2+|z_{1I}-\text{im}\{r_{1,1}x''_1\}-r_{1,2}x_{2I}|^2).$$

Thus, the following is true:

$$\{x_{2R}, x_{2I}\} = \arg\min_{x_{2R}, x_{2I} \in PAM} \min_{x_1, x'_1, \in QAM} \|z-Rx\|^2$$

$$x_{2R} = \arg\min_{x_{2R} \in PAM} \min_{x_1 \in QAM} (|z_{2R}-r_{2,2}x_{2R}|^2 + |z_{1R}-\text{re}\{r_{1,1}x'_1\}-r_{1,2}x_{2R}|^2)$$

$$x_{2I} = \arg\min_{x_{2I} \in PAM} \min_{x_1 \in QAM} (|z_{2I}-r_{2,2}x_{2I}|^2 + |z_{1I}-\text{im}\{r_{1,1}x''_1\}-r_{1,2}x_{2I}|^2)$$

As is evident from the above discussion, in the relaxed-metric two-stream ML algorithm, each distance metric is a sum of only two terms. This is in contrast to ML approaches having distance metrics comprising sums of a greater number of terms (e.g., each distance metric being a sum of four terms, etc.). Further, in the relaxed-metric two-stream ML algorithm, the set of values for $\text{re}\{r_{1,1}x'_1\}$ and $\text{im}\{r_{1,1}x'_1\}$ is the same. This set of values is computed once and used in the comparing and selecting block to find $\text{re}\{r_{1,1}x'_1\}$ and $\text{im}\{r_{1,1}x'_1\}$. In embodiments, the relaxed-metric two-stream ML algorithm is not interested in $x'_1$, and instead is interested in $\text{re}\{r_{1,1}x'_1\}$ and $\text{im}\{r_{1,1}x'_1\}$. In embodiments, all possible combinations of $(\text{re}\{r_{1,1}x'_1\}, \text{im}\{r_{1,1}x'_1\})$ does not exist, but the algorithm achieves a similar result considering all combinations.

Figure 4:
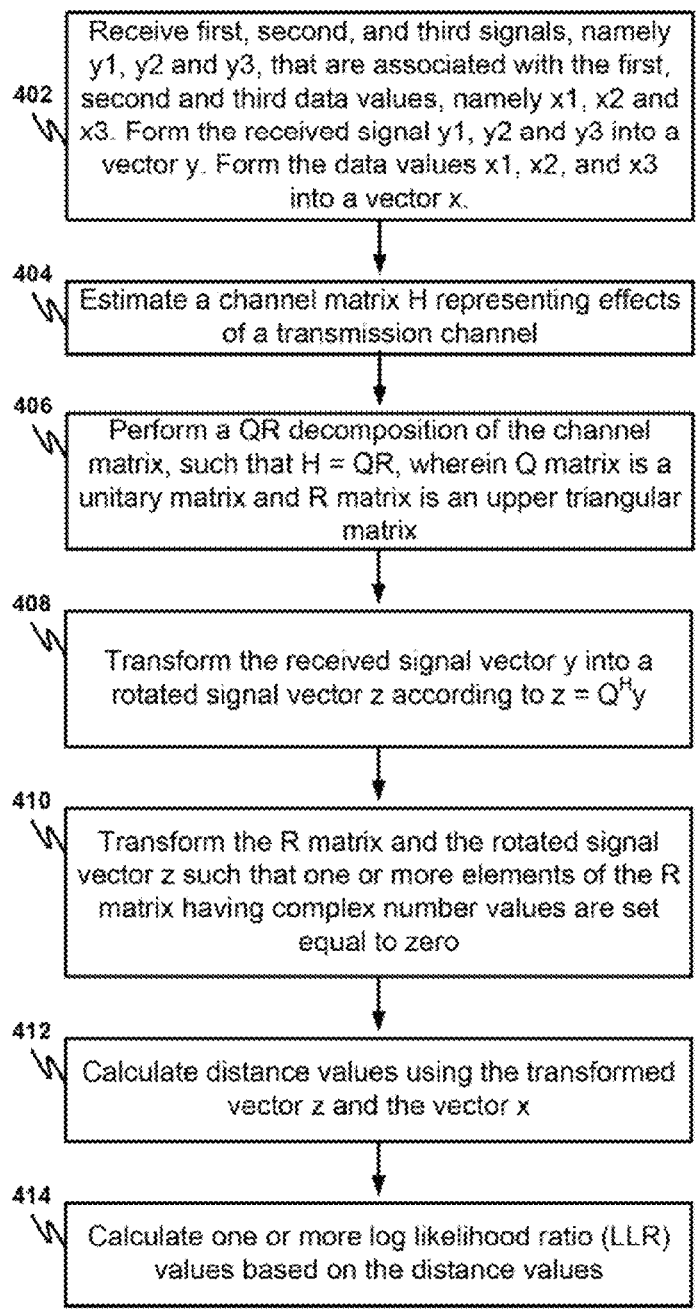
FIG. 4 is a flowchart illustrating an example method for detecting data in a received multiple-input-multiple-output (MIMO) signal using the ZF-ML algorithm discussed above with reference to FIGS. 1-3.

FIG. 4 is a flowchart illustrating an example method for detecting data in a received multiple-input-multiple-output (MIMO) signal using the ZF-ML algorithm disclosed above with reference to FIGS. 1-3. At 402, a first signal (y1), a second signal (y2), and a third signal (y3) are received via a transmission channel from first, second, and third antennas respectively. The received signals are associated with first data values (x1), second data values (x2), and third data values (x3). The first signal, the second signal, and the third signal are formed into a received signal vector y. The first data values, the second data values, and the third data values are formed into a vector x. At 404, a channel matrix (H) representing effects of the transmission channel on the first data values, the second data values, and the third data values is estimated. At 406, a QR decomposition of the channel matrix is performed, such that H=QR, where Q matrix is a unitary matrix and R matrix is an upper triangular matrix. At 408, the received signal vector y is transformed into a rotated signal vector z according to $z=Q^H y$. At 410, the R matrix and the rotated signal vector z are transformed such that one or more elements of the R matrix having complex number values are set equal to zero. At 412, distance values are calculated using the transformed vector z and the vector x. At 414, one or more log likelihood ratio (LLR) values are calculated based on the distance values.

Figure 5:
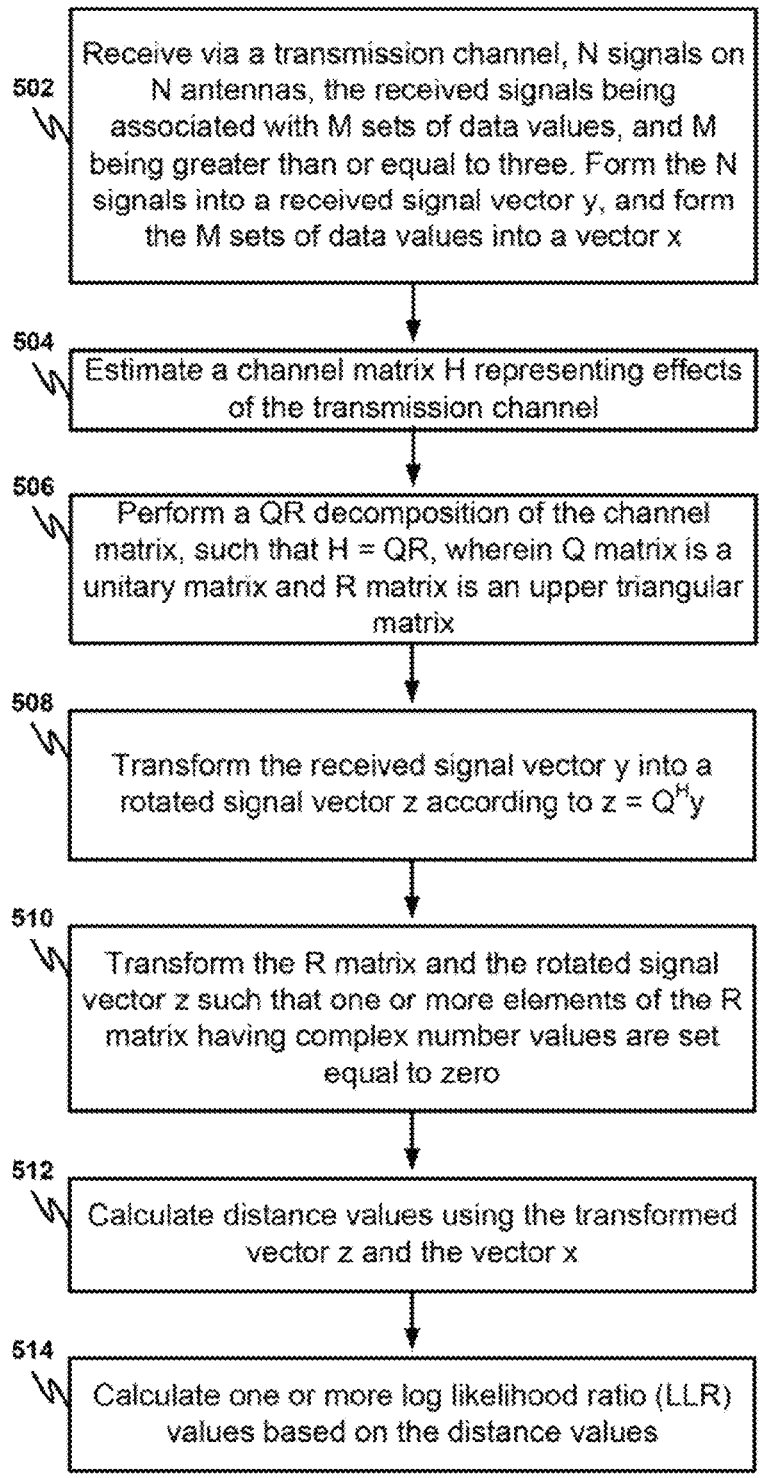
FIG. 5 is another flowchart illustrating an example method for detecting data in a received MIMO signal using the ZF-ML algorithm discussed above with reference to FIGS. 1-3, where a number of streams M is greater than or equal to three.

FIG. 5 is another flowchart illustrating an example method for detecting data in a received MIMO signal using the ZF-ML algorithm disclosed above with reference to FIGS. 1-3, where a number of streams M is greater than or equal to three. At 502, N signals are received on N antennas, where the received signals are associated with M sets of data values, M being greater than or equal to three. The N signals are formed into a received signal vector y, and the M sets of data values into a vector x. At 504, a channel matrix (H) representing effects of the transmission channel on the M sets of data values is estimated. At 506, a QR decomposition of the channel matrix is performed, such that H=QR, where Q matrix is a unitary matrix and R matrix is an upper triangular matrix. At 508, the received signal vector y is transformed into a rotated signal vector z according to $z=Q^H y$. At 510, the R matrix and the rotated signal vector z are transformed such that one or more elements of the R matrix having complex number values are set equal to zero. At 512, distance values are calculated using the transformed vector z and the vector x. At 514, one or more log likelihood ratio (LLR) values are calculated based on the distance values.

Figure 6:
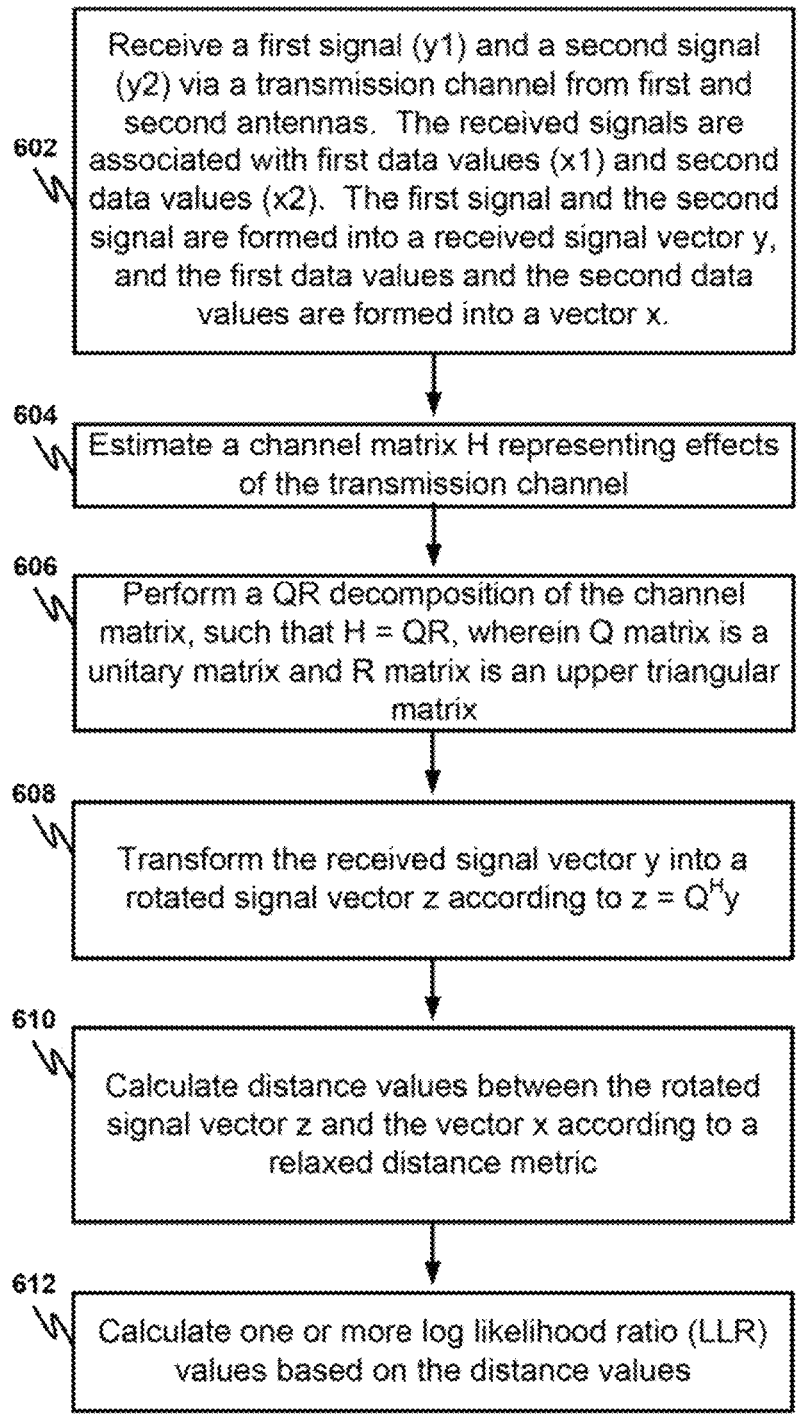
FIG. 6 is a flowchart illustrating an example method for detecting data in a received MIMO signal using a relaxed distance metric, according to an embodiment of the present disclosure.

FIG. 6 is a flowchart illustrating an example method for detecting data in a received MIMO signal using a relaxed distance metric, as described herein. At 602, a first signal (y1) and a second signal (y2) are received via a transmission channel from first and second antennas. The received signals are associated with first data values (x1) and second data values (x2). The first signal and the second signal are formed into a received signal vector y, and the first data values and the second data values are formed into a vector x. At 604, a channel matrix (H) representing effects of the transmission channel on the first data values and the second data values is estimated. At 606, a QR decomposition of the channel matrix is performed, such that H=QR, where Q matrix is a first unitary matrix and R matrix is an upper triangular matrix. At 608, the received signal vector y is transformed into a rotated signal vector z according to $z=Q^H y$. At 610, distance values are calculated using the rotated signal vector z and the vector x according to a relaxed distance metric, where the relaxed distance metric includes at least first and second terms, and a variable in the first term is permitted to have a different value than the same variable in the second term. At 612, one or more log likelihood ratio (LLR) values are calculated based on the distance values.

Figure 7:
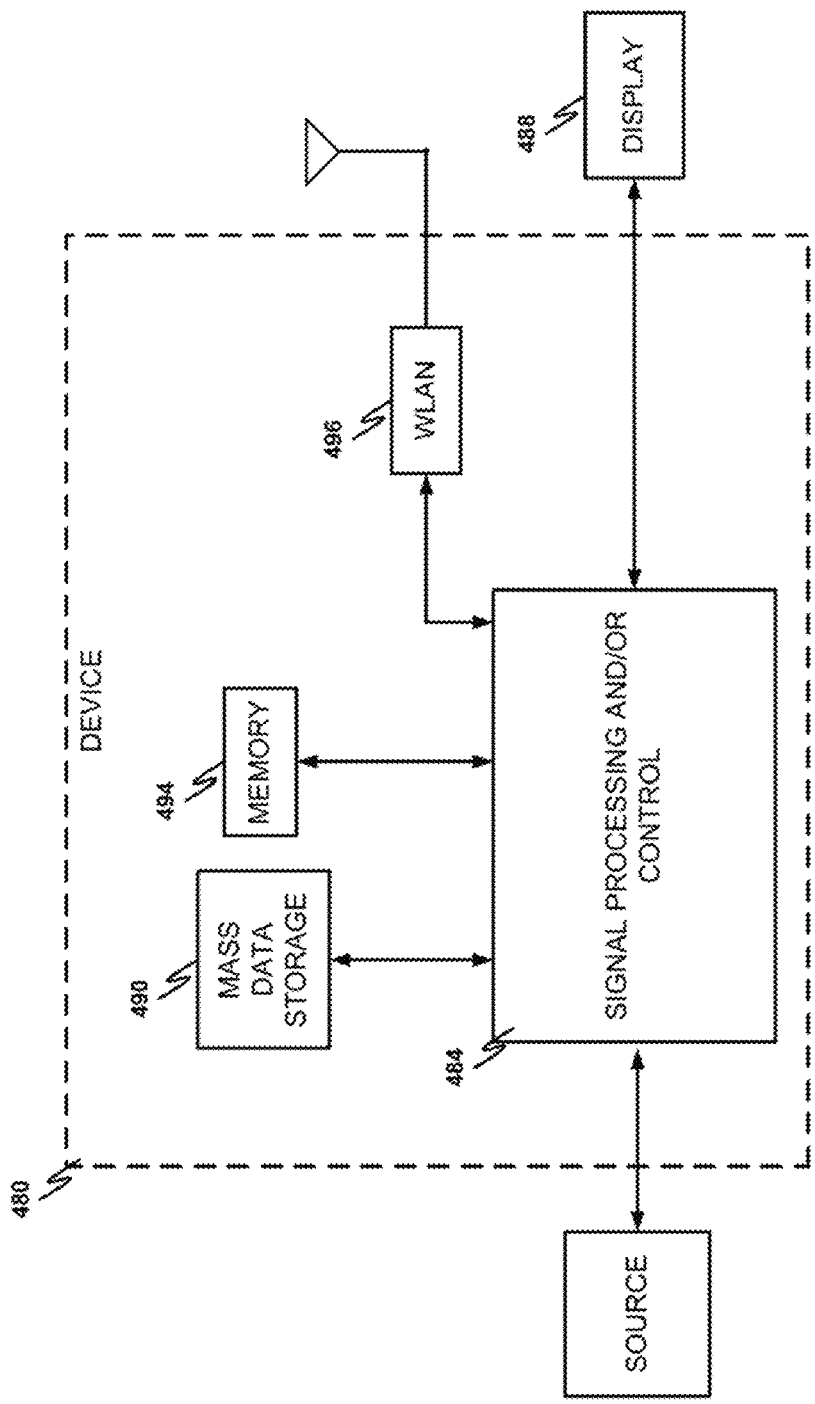
FIG. 7 depicts an example device illustrating an implementation of the present disclosure.

FIG. 7 depicts an example device 480 illustrating an implementation of the present disclosure. The device 480 can be any device capable of wireless communication, e.g., a cellular phone, set top box, smart phone, computer system, and the like. The techniques of the present disclosure may implement signal processing or control circuits 484, a WLAN interface 496, or mass data storage 490 of the device 480. Signal processing or control circuits 484 or other circuits (not shown) of the device 480 may process data, perform coding or encryption, perform calculations, format data, or perform any other function as required by an application for the device 480.

The device 480 may communicate with mass data storage 490 that stores data in a nonvolatile manner. Mass data storage 490 may include optical or magnetic storage devices, for example hard disk drives HDD or DVD drives. The device 480 may be connected to memory 494 such as RAM, ROM, low latency nonvolatile memory such as flash memory, or other suitable electronic data storage. The device 480 may also support connections with a WLAN via the WLAN network interface 496.

This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method of detecting data in a received multiple-input-multiple-output (MIMO) signal, the method comprising:
   receiving, via a transmission channel, a first signal (y1), a second signal (y2), and a third signal (y3) from first, second, and third antennas, respectively, wherein the received signals are associated with first data values (x1), second data values (x2), and third data values (x3);
   forming the first signal, the second signal, and the third signal into a received signal vector y;
   forming the first data values, the second data values, and the third data values into a vector x;
   estimating a channel matrix (H) representing effects of the transmission channel on the first data values, the second data values, and the third data values;
   performing a QR decomposition of the channel matrix, such that H=QR, wherein Q matrix is a unitary matrix and R matrix is an upper triangulaR matrix that includes non-zero elements above a diagonal of the R matrix;
   transforming the received signal vector y into a rotated signal vector z according to $z=Q^H y$;
   transforming the R matrix and the rotated signal vector z by steps including
      setting a first matrix element from among the above-diagonal non-zero elements to zero,
      adjusting a second matrix element from among the above-diagonal non-zero elements, and
      adjusting an element of the vector z;
   calculating distance values using the transformed vector z and the vector x; and
   calculating one or more log likelihood ratio (LLR) values based on the distance values.

2. The method of claim 1, wherein
prior to the transforming of the R matrix and the rotated signal vector z, the R matrix is $$\begin{bmatrix} r_{11} & r_{12} & r_{13} \\ 0 & r_{22} & r_{23} \\ 0 & 0 & r_{33} \end{bmatrix},$$

and the rotated signal vector z is [z1, z2, z3], and
after the transforming of the R matrix and the rotated signal vector z, the transformed R matrix is $$\begin{bmatrix} r'_{11} & 0 & r'_{13} \\ 0 & r_{22} & r_{23} \\ 0 & 0 & r_{33} \end{bmatrix},$$

and the transformed vector z is [z1', z2, z3].

3. The method of claim 2, wherein the method further comprises:
   calculating a first product to determine z1' according to $$z1' = \left(z1 - \frac{r_{12}}{r_{22}} z2\right) \frac{1}{\sqrt{1 + \left|\frac{r_{12}}{r_{22}}\right|^2}},$$

calculating a second product to determine $r_{11}'$ according to $$r'_{11} = r_{11} \frac{1}{\sqrt{1 + \left|\frac{r_{12}}{r_{22}}\right|^2}},$$

and
   calculating a third product to determine $r_{13}'$ according to $$r'_{13} = \left(r_{13} - \frac{r_{12}}{r_{22}} r_{23}\right) \frac{1}{\sqrt{1 + \left|\frac{r_{12}}{r_{22}}\right|^2}}.$$

4. The method of claim 3, wherein the calculating of the first, second, and third products includes performing one or more coordinate rotational digital computer (CORDIC) computations.

5. The method of claim 2, wherein one or more of the distance values are calculated according to $$T1+T2+T3=|z1'-r_{11}'x1-r_{13}'x3|^2+|z2-r_{22}x2-r_{23}x3|^2+|z3-r_{33}x3|^2$$

wherein T1+T2+T3 corresponds to the one or more distance values, and x1, x2 and x3 are respectively the first, second and third data values.

6. The method of claim 5, further comprising:
   determining an x1 value that minimizes the T1 term based on $$\frac{z1'\tau}{r'_{11}} - \frac{r'_{13}}{r'_{11}} x3,$$

where τ is a constellation-specific scaling factor.

7. A method of detecting data in a received multiple-input-multiple-output (MIMO) signal, the method comprising:
   receiving, via a transmission channel, N signals from M respective spatial streams, the received signals being associated with M sets of data values, and M being greater than or equal to three, wherein N is number of signals and M is number of data values;

forming the N signals into a received signal vector y;
forming the M sets of data values into a vector x;
estimating a channel matrix (H) representing effects of the transmission channel on the M sets of data values;
performing a QR decomposition of the channel matrix, such that H=QR, wherein Q matrix is a unitary matrix and R matrix is an upper triangulaR matrix that includes non-zero elements above a diagonal of the R matrix;
transforming the received signal vector y into a rotated signal vector z according to $z=Q^H y$;
transforming the R matrix and the rotated signal vector z by steps including
setting a first matrix element from among the above-diagonal non-zero elements to zero,
adjusting a second matrix element from among the above-diagonal non-zero elements, and
adjusting an element of the vector z;
calculating distance values using the transformed vector z and the vector x; and
calculating one or more log likelihood ratio (LLR) values based on the distance values.

8. The method of claim 7, wherein the setting corresponds to setting one or more non-diagonal elements $r_{ij,j>i}$ of the R matrix equal to zero based on calculating, for a row i of the R matrix, a product $$\frac{1}{\sqrt{1+\frac{|r_{ij}|^2}{r_{jj}^2}}}\left(\text{Row}_i - \frac{r_{ij}}{r_{jj}}\text{Row}_j\right)$$

wherein i and j are respectively row number and column number of the R matrix.

9. The method of claim 8, wherein the calculating of the product includes performing one or more CORDIC computations.

10. The method of claim 7, wherein the first matrix element is in the 12 position of the R matrix.

11. The method of claim 7, wherein the second matrix element is adjusted as a function of (i) a pre-adjusted value of the second matrix element and (ii) a value of the first matrix element prior to the first matrix element being set to zero.

12. The method of claim 11, wherein the element of the vector z is adjusted as a function of a pre-adjusted value of the vector z and (ii) a value of the first matrix element prior to the first matrix element being set to zero.

13. A method of detecting data in a received multiple-input-multiple-output (MIMO) signal, the method comprising:
receiving, via a transmission channel, a first signal (y1), a second signal (y2), and a third signal (y3) from first, second, and third antennas, respectively, wherein the received signals are associated with first data values (x1), second data values (x2), and third data values (x3);
estimating a channel matrix H representing effects of the transmission channel on the first data values, the second data values, and the third data values;
performing a QR decomposition of the channel matrix;
after performing the QR decomposition, calculating first log likelihood ratio (LLR) values using a first algorithm;
after performing the QR decomposition, calculating second LLR values using a second algorithm; and
combining the first and second LLR values;
wherein the calculating of the first LLR values comprises (i) performing a QR decomposition of the channel matrix [h1 h2 h3] using a first upper triangulaR matrix, and (ii) computing the first LLR values based on an expression $$y1' = \begin{bmatrix} r_{22} & r_{23} \\ 0 & r_{33} \end{bmatrix}\begin{bmatrix} x2 \\ x3 \end{bmatrix} + n1',$$

where n1' represents a first noise, y1' represents a variant of y1, and $$\begin{bmatrix} r_{22} & r_{23} \\ 0 & r_{33} \end{bmatrix}$$

comprises a portion of the first upper triangulaR matrix; and
wherein the calculating of the second LLR values comprises (i) performing a QR decomposition of [h2 h1 h3] using a second upper triangulaR matrix, and (ii) calculating the second LLR values based on an expression $$y2' = \begin{bmatrix} l_{22} & l_{23} \\ 0 & l_{33} \end{bmatrix}\begin{bmatrix} x1 \\ x3 \end{bmatrix} + n2',$$

where n2' represents a second noise, y2' represents a variant of y2, and $$\begin{bmatrix} l_{22} & l_{23} \\ 0 & l_{33} \end{bmatrix}$$

comprises a portion of the second upper triangulaR matrix; and
wherein in the performing of the QR decomposition of the channel matrix [h1 h2 h3], the first upper triangulaR matrix is $$\begin{bmatrix} r_{11} & r_{12} & r_{13} \\ 0 & r_{22} & r_{23} \\ 0 & 0 & r_{33} \end{bmatrix},$$

such that $$y1 = \begin{bmatrix} r_{11} & r_{12} & r_{13} \\ 0 & r_{22} & r_{23} \\ 0 & 0 & r_{33} \end{bmatrix}\begin{bmatrix} x1 \\ x2 \\ x3 \end{bmatrix} + n1,$$

where n1' is a variant of n1; and
wherein in the performing of the QR decomposition of [h2 h1 h3], a second upper triangulaR matrix is $$\begin{bmatrix} l_{11} & l_{12} & l_{13} \\ 0 & l_{22} & l_{23} \\ 0 & 0 & l_{33} \end{bmatrix},$$

such that $$y1 = \begin{bmatrix} l_{11} & l_{12} & l_{13} \\ 0 & l_{22} & l_{23} \\ 0 & 0 & l_{33} \end{bmatrix} \begin{bmatrix} x2 \\ x1 \\ x3 \end{bmatrix} + n2,$$

where n2' is a variant of n2.

14. The method of claim 13, wherein the combining of the first and second LLR values utilizes weights for the respective first and second LLR values.

15. A method of detecting data in a received multiple-input-multiple-output (MIMO) signal, the method comprising:
- receiving, via a transmission channel, a first signal (y1) and a second signal (y2) from first and second antennas, wherein the received signals are associated with first data values (x1) and second data values (x2);
- forming the first signal and the second signal into a received signal vector y;
- forming the first data values and the second data values into a vector x;
- estimating a channel matrix (H) representing effects of the transmission channel on the first data values and the second data values;
- performing a QR decomposition of the channel matrix, such that H=QR, wherein Q matrix is a first unitary matrix and R matrix is an upper triangulaR matrix, and the R matrix includes one or more complex number values and one or more real number values;
- transforming the received signal vector y into a rotated signal vector z according to z=Q$^H$y;
- calculating distance values using the rotated signal vector z and the vector x according to a distance metric, the distance metric including at least first and second terms, wherein a variable in the first term is permitted to have a different value than the same variable in the second term; and
- calculating one or more log likelihood ratio (LLR) values based on the distance values;
- transforming the R matrix and the rotated signal vector z with a second unitary matrix such that (i) an element of the R matrix having a complex number value prior to the transforming has a real number value after the transforming, and (ii) an element of the R matrix having a real number value prior to the transforming has a complex number value after the transforming;

wherein:
prior to the transforming of the R matrix $$\begin{bmatrix} r_{11} & r_{12} \\ 0 & r_{22} \end{bmatrix},$$

$r_{11}$ and $r_{22}$ are real number values and $r_{12}$ is a complex number value;
the second unitary matrix is $$\begin{bmatrix} e^{-j\theta_{12}} & 0 \\ 0 & 1 \end{bmatrix};$$

and
after the transforming of the R matrix, $r_{12}$ and $r_{22}$ are real number values and $r_{11}$ is a complex number value;
the calculating of the distance values is according to an expression $$= (|z_{2R} - r_{2,2}x_{2R}|^2 + |z_{1R} - re\{r_{1,1}x_1\} - r_{1,2}x_{2R}|^2) + (|z_{2I} - r_{2,2}x_{2I}|^2 + |z_{1I} - im\{r_{1,1}x_1\} - r_{1,2}x_{2I}|^2),$$

the terms $z_{1R}$, $z_{2R}$, $x_{2R}$ represent real number values;
the terms $z_{1I}$, $z_{2I}$, $x_{2I}$ represent imaginary number values;
the variable x1 in the first term $(|z_{2R} - r_{2,2}x_{2R}|^2 + |z_{1R} - re\{r_{1,1}x_1\} - r_{1,2}x_{2R}|^2)$ is permitted to have a different value than the same variable x1 in the second term $(|z_{2I} - r_{2,2}x_{2I}|^2 + |z_{1I} - im\{r_{1,1}x_1\} - r_{1,2}x_{2I}|^2)$.

\* \* \* \* \*